United States Patent
Suzuki et al.

[19]

[11] Patent Number: 6,112,864
[45] Date of Patent: Sep. 5, 2000

[54] DISC BRAKE

[75] Inventors: Shinji Suzuki, Yamanashi-ken; Tadaaki Nakamura, Saitama-ken, both of Japan

[73] Assignee: Tokico Ltd., Kanagawa-ken, Japan

[21] Appl. No.: 09/273,497

[22] Filed: Mar. 22, 1999

[30] Foreign Application Priority Data

Mar. 30, 1998 [JP] Japan .................................. 10-102111

[51] Int. Cl.$^7$ ...................................................... B60L 7/00
[52] U.S. Cl. .................... 188/158; 188/72.4; 188/72.7; 188/73.45; 188/196
[58] Field of Search ................................ 188/72.1, 72.2, 188/72.3, 72.7, 73.39, 73.43, 73.45, 158, 159, 162, 196

[56] References Cited

U.S. PATENT DOCUMENTS

| | | | |
|---|---|---|---|
| 4,529,067 | 7/1985 | Scott | 188/73.45 |
| 4,557,354 | 12/1985 | Sakakibara | 188/73.45 |
| 4,762,206 | 8/1988 | Arimitsu | 188/73.45 |
| 4,805,746 | 2/1989 | Katagiri | 188/73.45 |
| 5,188,202 | 2/1993 | Terashima | 188/73.45 |
| 5,829,557 | 11/1998 | Halasy-Wimmer et al. | 188/162 |
| 5,931,268 | 8/1999 | Kingston et al. | 188/72.3 |

FOREIGN PATENT DOCUMENTS

| | | |
|---|---|---|
| 57-65432 | 4/1982 | Japan . |
| 58-156738 | 9/1983 | Japan . |

*Primary Examiner*—Chris Schwartz
*Attorney, Agent, or Firm*—Wenderoth, Lind & Ponack, L.L.P.

[57] ABSTRACT

A pin slide mechanism 3 comprises a pair of support portions 23, 24 on a carrier 1 secured to a non-rotating portion of a vehicle. A support portion 24 provided on a tip end of an arm 28 extends from the carrier 1 inwardly of the vehicle. By slidably fitting a cylindrical portion 27 provided on a caliper body 2 via a sleeve 26 onto a pin portion 25*a* of a pin/bolt 25, the caliper body 2 is secured to the support portions 23, 24. The caliper has an increased weight by containing an electrically-driven device therein, and is supported by the support portions 23, 24 in a straddle-mounted fashion to prevent inclination of the caliper during braking.

5 Claims, 7 Drawing Sheets

DISC BRAKE

BACKGROUND OF THE INVENTION

The present invention relates to a disc brake for a vehicle, and more particularly, it relates to a disc brake of a caliper-floating type.

In general, a disc brake of a caliper-floating type comprises a pair of brake pads disposed on both sides of a disc rotor, and a carrier extending in a straddling relation to the outer periphery of the disc rotor. The carrier has a bridge portion for supporting the pair of brake pads to allow shifting movement in the axial direction of the disc rotor, and is secured to a non-rotating part of a vehicle disposed inwardly of the disc rotor in the vehicle. The disk brake also comprises a caliper body in which an operation portion containing a push mechanism for pushing an inner side pad (of the pair of brake pads) is disposed inwardly of the disc rotor, and in which a pawl portion for pushing an outer side pad (of the pair of brake pads) is disposed outwardly of the disc rotor in the vehicle. The pawl portion is interconnected to the operation portion and straddles the outer periphery of the disc rotor. Finally, a pin slide mechanism for supporting the caliper body is provided for shifting movement in the axial direction of the disc rotor with respect to the carrier.

Generally, in the conventional pin slide mechanism, a proximal (base) end of a pin is secured to each of left and right arm portions extending from both sides of the operation portion of the caliper body, and the pin is slidably inserted into a pin hole formed in the bridge portion of the carrier so that the caliper body is supported by the carrier in a cantilever fashion. However, in such an arrangement, a weight of the operation portion of the caliper body containing the pushing mechanism for pushing the inner side pad is considerably great. Therefore, a gravity center of the caliper is offset toward the interior of the vehicle. Due to such unbalance of weight, there arose problems that the caliper body is inclined with respect to the braking faces of the disc rotor during braking so as to cause an increase in drag torque and deterioration of the judder property, as well as an increase in vibration due to pin clearance. Further, due to such unbalance of weight, it is difficult to control a posture of the caliper body in assembling the caliper body on the carrier, thereby worsening an assembling ability. Particularly, in recent years, so-called electrically-driven disc brake (for an example, refer to International Publication WO 96/03301) in which an electrically-driven device is used as the pushing mechanism of the operation portion of the caliper body has been used relatively widely. In such a disc brake, however, since a weight of the operation portion of the caliper body housing the electrically-driven device is considerably increased, the above-mentioned problems become more noticeable. If they try to solve these problems, the pin slide mechanism must be made in a large size, which results in bulkiness of the disc brake.

SUMMARY OF THE INVENTION

The present invention aims to eliminate the above-mentioned conventional drawbacks, and an object of the present invention is to provide a disc brake in which reduction of braking ability and occurrence of vibration or worsening of the assembling ability due to an unbalance of the weight of the caliper can be prevented without making a pin slide mechanism bulky, thereby ensuring high reliability.

To achieve the above object, the present invention provides a disc brake characterized in that a pin slide mechanism for causing a carrier to support a caliper body in a floating condition comprises a pair of support portions provided on either the carrier or the caliper body and spaced apart from each other in an axial direction of a disc rotor. A pin is provided which has both ends supported by the pair of support portions. A cylindrical portion is provided on the carrier or the caliper body (whichever does not have the pair of support portions) and slidably receives the pin, and a sliding range of the cylindrical portion with respect to the pin is disposed inwardly of the disc rotor.

In a disc brake having the above-mentioned arrangement, by fitting the cylindrical portion onto the pin having both ends supported by the pair of support portions, the caliper body is supported by the carrier in a straddle-mounted fashion. Since the sliding range of the cylindrical portion with respect to the pin is disposed inwardly of the disc rotor within the vehicle, a gravity center of the caliper body can be positioned within this sliding range. Thus, even if great weight unbalance occurs in the caliper body, the supporting ability is reliable. Therefore, the caliper body is not inclined with respect to a braking face of the disc rotor and vibration due to pin clearance can be suppressed during the braking.

In the present invention, the pin slide mechanism may be disposed outwardly of a bridge portion of the carrier in a plane parallel to a plane including an axis of the disc rotor and also including an axial direction center line of the carrier. With this arrangement, it is not required that any groove is formed in the bridge portion of the carrier or that the cylindrical portion of the caliper body is positioned at a more laterally extended position in order to prevent the interference between the pin and the bridge portion. The caliper body can easily be assembled to the carrier by inserting the pin into the pair of support portions and the cylindrical portion from outside of the vehicle.

The present invention does not limit the kind of urging mechanism contained in the operating portion of the caliper body. The urging mechanism may include an electrically-driven device having a motor, an urging member shiftable in an axial direction of the disc rotor, and a motion converting mechanism for converting rotation of the motor into a straight movement of the urging member.

DETAILED DESCRIPTION OF THE INVENTION

Figure 1:
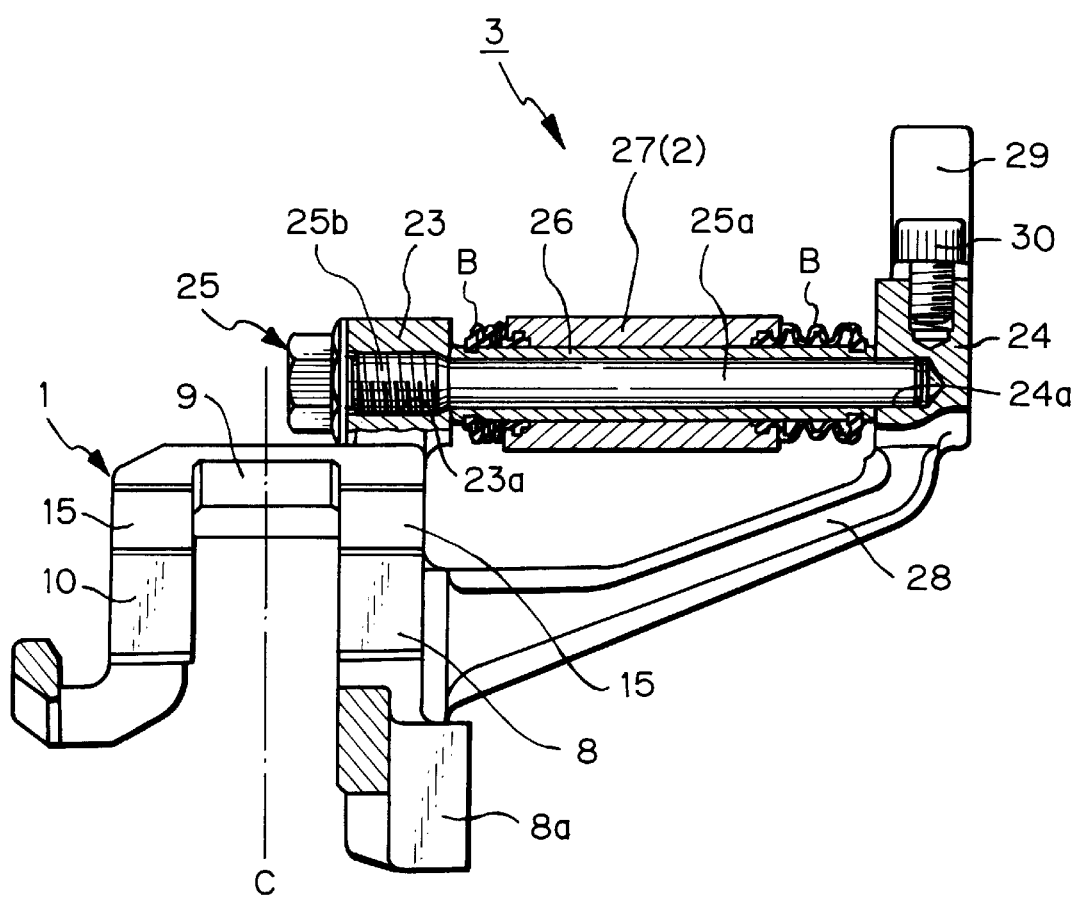
FIG. 1 is a sectional view showing a pin slide mechanism of an electrically-driven disc brake according to a first embodiment of the present invention.
Figure 2:
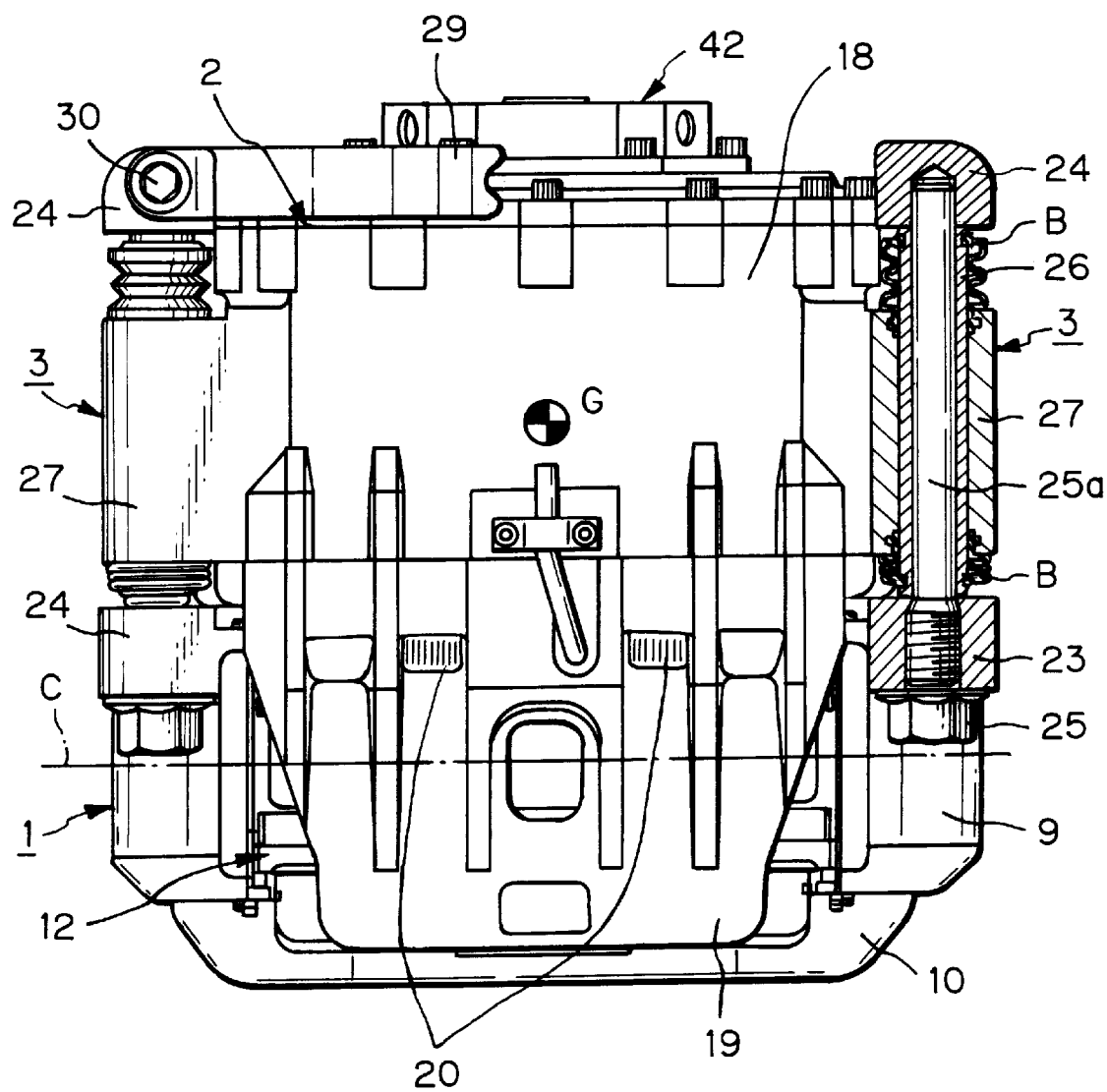
FIG. 2 is a plan view, partial in section, showing an entire structure of the disc brake according to the first embodiment.

The present invention will now be explained in connection with embodiments thereof with reference to the accompanying drawings.

FIGS. 1 to 5 show an electrically-driven disc brake according to a first embodiment of the present invention. In FIGS. 1 to 5, the disc brake includes a carrier 1 secured to a knuckle N (FIGS. 4 and 5) of a vehicle disposed inwardly of a disc rotor D in the vehicle, and a caliper body 2 supported by the carrier 1 for floating movement via two left and right pin slide mechanisms 3 which will be described later. The caliper body 2 includes therein an electrically-driven device (pushing mechanism) 7 (fully described later) comprising a motor 4, an urging member 5, and a motion converting mechanism 6 for converting rotation of the motor 4 into a straight movement of the urging member 5.

Figure 3:
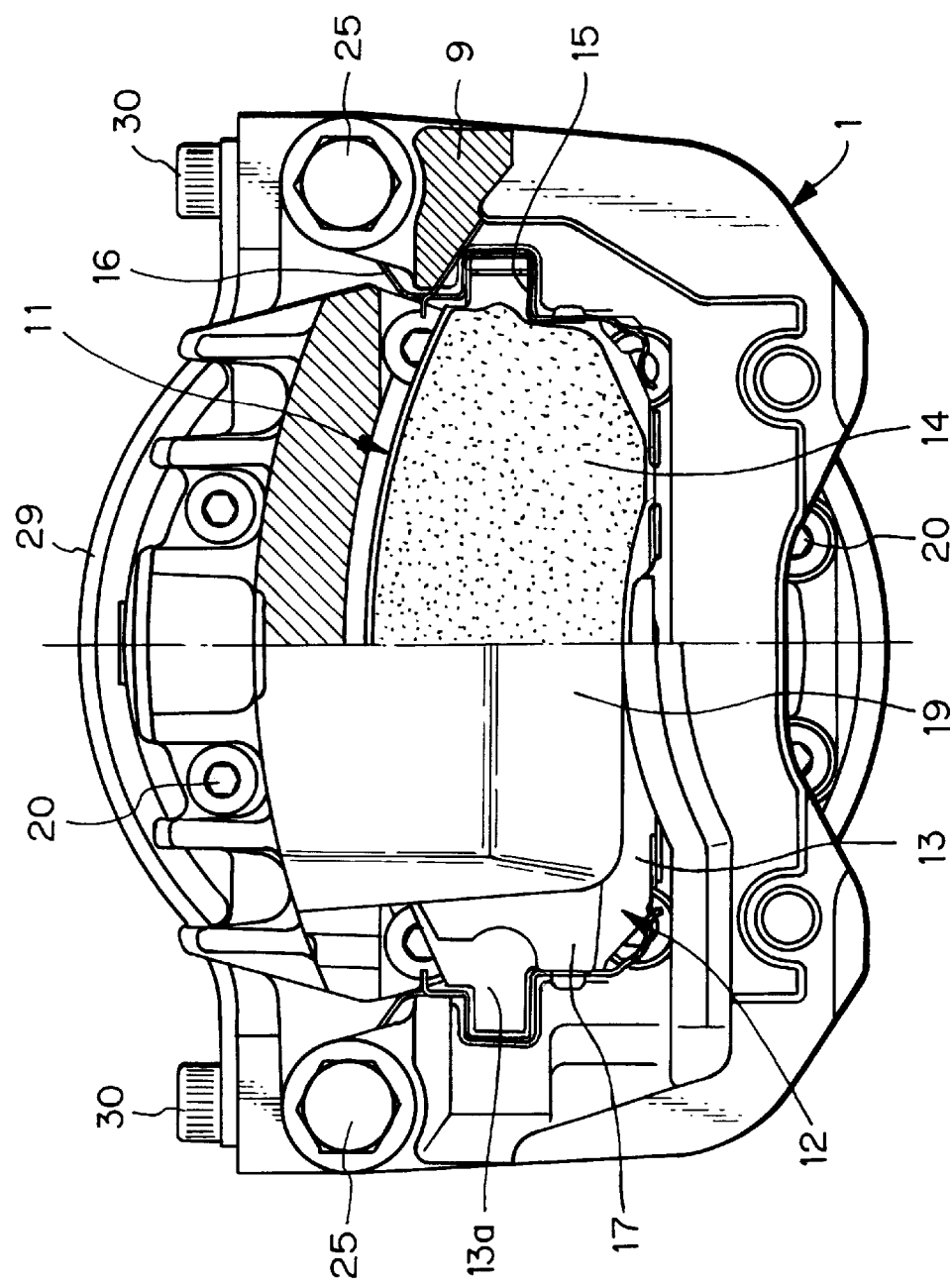
FIG. 3 is a front view, partial in section, showing the entire structure of the disc brake according to the first embodiment, viewed from the outside of a vehicle.
Figure 4:
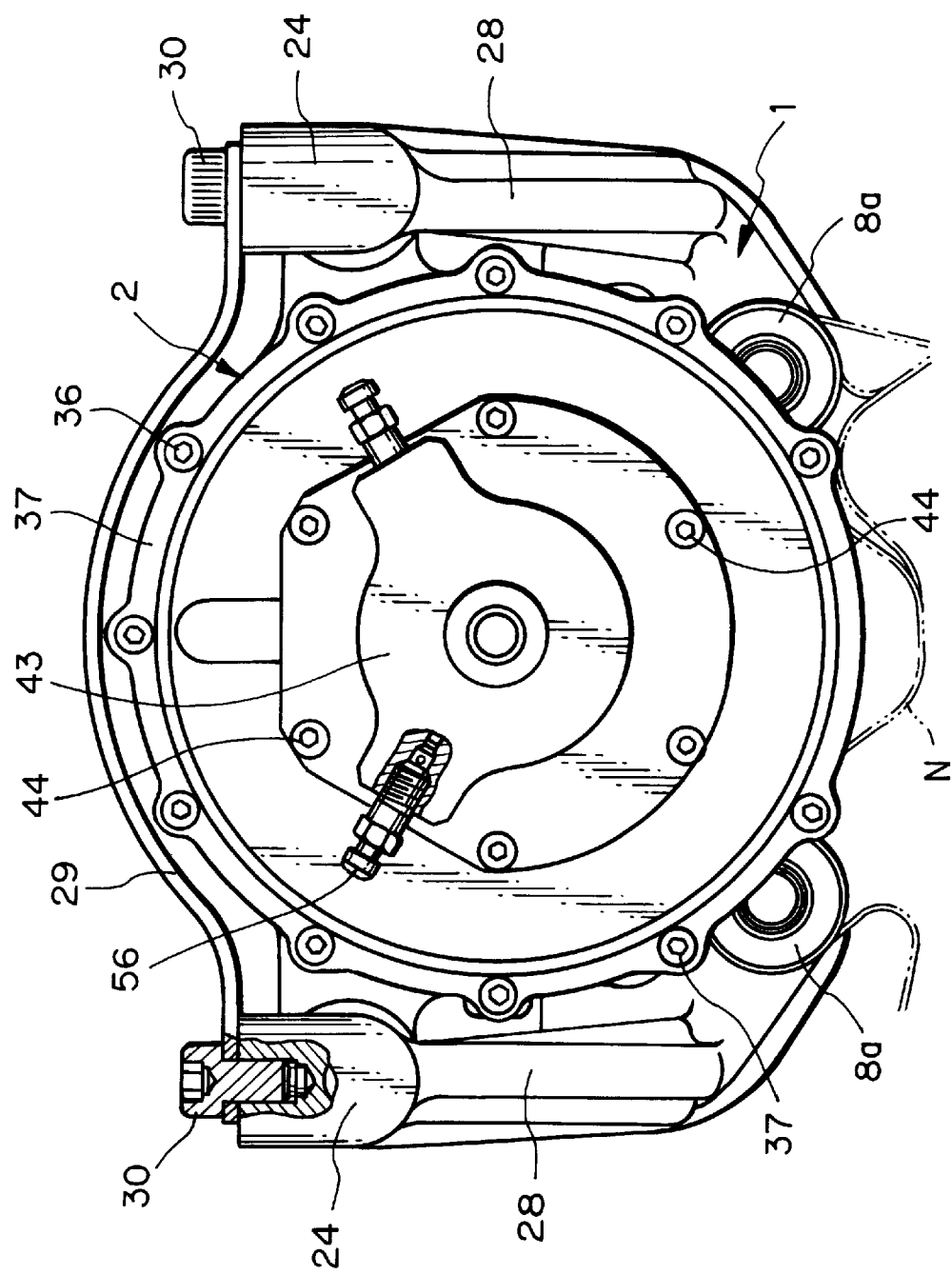
FIG. 4 is a front view showing the entire structure of the disc brake according to the first embodiment, viewed from the inside of the vehicle.
Figure 5:
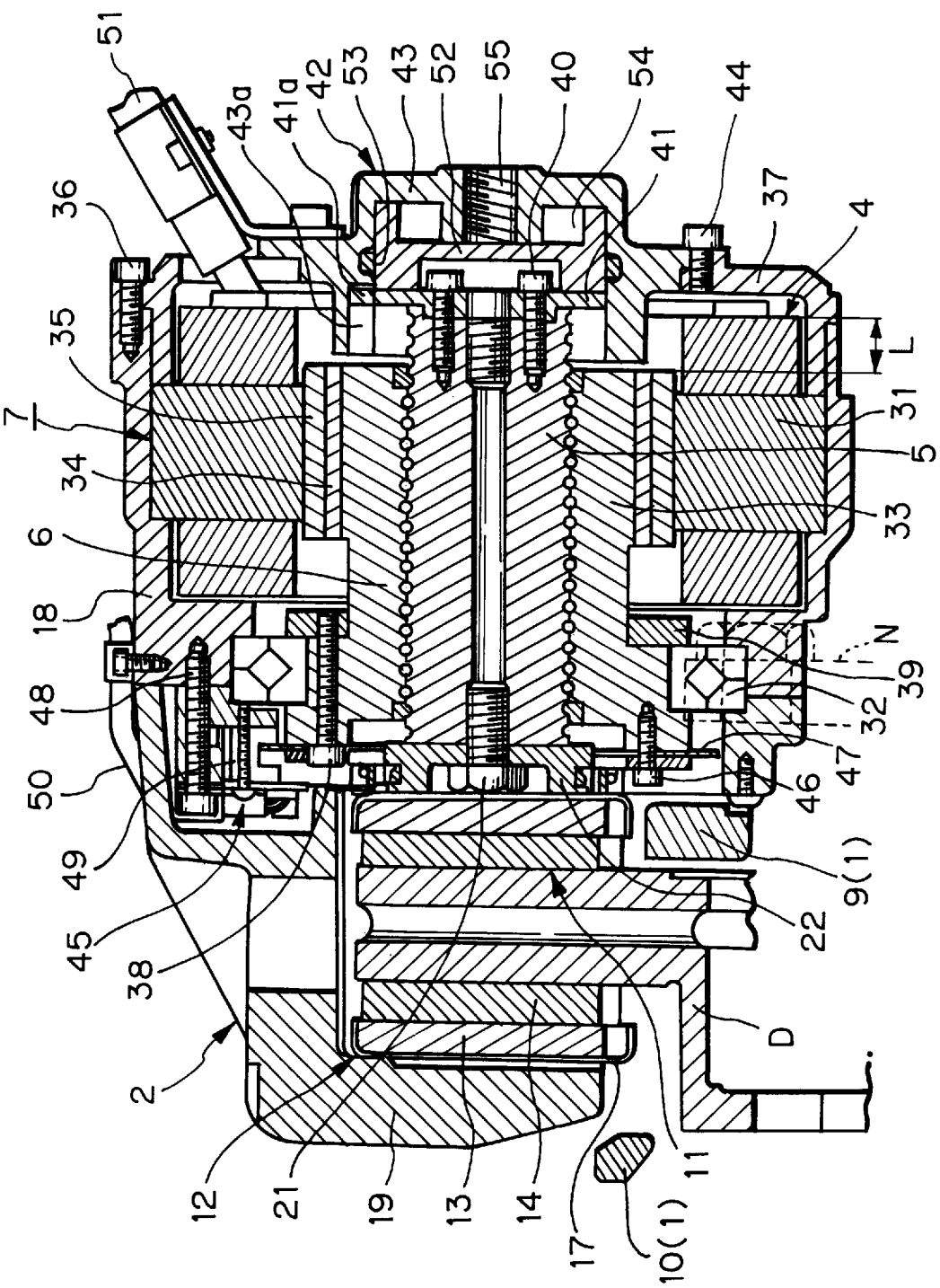
FIG. 5 is a sectional view of a structure of an electrically-driven device constituting the disc brake according to the first embodiment.

The carrier 1 has a fixed portion 8 having a pair of attachment bosses 8a for the knuckle N, a bridge portion 9 extending outwardly of the vehicle while straddling the disc rotor D in a condition that the carrier is secured to the knuckle N, and a depending portion 10 extending radially inwardly of the disc rotor D from a distal end of the bridge portion 9. The fixed portion 8 and the depending portion 10 support an inner side pad 11 and an outer side pad 12 in a suspended fashion, respectively. More specifically, each pad 11, 12 comprises a rear plate (back plate) 13 and a friction material friction pad 14 adhered to the rear plate 13. The rear plate 13 is provided at both of its sides with ear portions 13a (FIG. 3) fittable into recesses 15 formed in the fixed portion 8 and the depending portion 10 of the carrier 1. By fitting the ear portions 13a of the rear plates 13 into the recesses 15, the pads 11, 12 are supported by the carrier 1 for sliding movement in an axial direction of the disc rotor D, and upright postures of the pads are maintained by pad springs 16 seated in the recesses 15 of the carrier 1. Incidentally, the reference numeral 17 denotes noise preventing shims mounted on the rear surfaces of the rear plates 13 (FIGS. 3 and 5).

The caliper body 2 comprises a body portion 18 containing the electrically-driven device 7, and an L-shaped pawl portion 19 extending from the body portion 18 outwardly of the vehicle while straddling the disc rotor D. The body portion 18 and the pawl portion 19 are formed from different members which are integrally interconnected by using a plurality of (eight in the illustrated embodiment) bolts 20. As shown in FIG. 5, a pressing plate 22 is secured by a bolt 21 to a distal end of the urging member 5 constituting the electrically-driven device 7, and this pressing plate 22 abuts against the rear surface of the inner side pad 11. With this, arrangement, when the urging member 5 advances toward the disc rotor D as the motor 4 is rotated, the inner side pad 11 is urged against one side surface of the disc rotor D by the pressing plate 22. At the same time, due to an urging reaction force, the caliper body 2 is shifted away from the urging member 5 to urge the outer side pad 12 against the other side surface of the disc rotor D via the pawl portion 19. As a result, the disc rotor D is pinched between the pads 11 and 12, thereby generating a desired braking force.

On the other hand, as best seen in FIG. 1, each pin slide mechanism 3 for enabling the carrier 1 to support the caliper body 2 for floating movement generally comprises a pair of support portions 23, 24 provided on the carrier 1, a pin/bolt 25 bridging the pair of support portions 23 and 24, a sleeve 26 fitted on a pin portion 25a of the pin/bolt 25, and a cylindrical portion 27 extending from a side surface of the body portion 18 of the caliper body 2 and slidably fitted on the sleeve 26.

The support portion 23 (of the pair of support portions 23, 24 provided on the carrier 1) is located at an upper part of the fixed portion 8 of the carrier 1, and the other support portion 24 is located at a distal end portion of a corresponding arm 28 extending from the vicinity of the corresponding attachment boss 8a of the fixed portion 8. The pair of support portions 23, 24 are opposed to each other in the axial direction of the disc rotor D. Each support portion 23 located near the disc rotor D is provided with a threaded hole 23a and the other support portion 24 is provided with a recessed hole 24a. The corresponding pin/bolt 25 is secured to the carrier 1 by inserting the pin portion 25a through the threaded hole 23a and fitting the pin portion into the recessed hole 24a, and by threading a threaded portion 25b (near a head) of the pin/bolt into the threaded hole 23a. Each sleeve 26 has a length substantially equal to a distance between the pair of support portions 23 and 24. Accordingly, the position of the sleeve is fixed on the pin portion 25a in the axial direction. On the other hand, each cylindrical portion 27 provided on the caliper body 2 has a length smaller than the distance between the pair of support portions 23 and 24 (at least by an amount obtained by adding the thickness of the portion of the friction material 14 of the pad 12 to be worn during use to the thickness of the portion of one side surface of the disc rotor D to be worn during use). The gravity center of the caliper body is included within the range of the length of the cylindrical portion 27 in the axial direction of the disc rotor D. Accordingly, the caliper body 2 can be shifted in the axial direction of the disc rotor D within the range through which the cylindrical portion 27 can be slid on the sleeve 26. Incidentally, dust boots B for covering exposed portions of the sleeve 26 are mounted between both ends of the cylindrical portion 27 and the both ends of the sleeve 26, thereby maintaining cleanness of the sliding face. Both ends of a reinforcing member 29 straddling between the left and right pin slide mechanisms 3 are secured to the support portions 24 of the arms 28 by bolts 30, thereby ensuring rigidity of the arms 28.

By designing the pin slide mechanisms 3 in this way, when the urging member 5 is advanced toward the disc rotor D to urge the inner side pad 11 against one side surface of the disc rotor D as the electric motor 4 is rotated, the urging reaction force acts on the caliper body 2 thereby to slide the cylindrical portions 27 of the caliper body 2 on the sleeves 26 inwardly of the vehicle. Consequently, the outer side pad 12 is urged against the other side surface of the disc rotor D by the pawl portion 19 of the caliper body 2. That is to say, upon energization of the electrically-driven device 7, the disc rotor D is pinched between the inner side pad 11 and the outer side pad 12, thereby generating the desired braking force.

The electrically-driven device 7 is mounted in the caliper body 2 which is supported between the pair of support portions 23 and 24 constituting the pin slide mechanisms 3. Therefore, the caliper is supported in a straddle-mounted fashion so that the heavy caliper is stably supported, and so that the occurrence of vibration due to clearances (pin clearances) between the sleeves 26 and the cylindrical portions 27 is suppressed. Further, since the pin slide mechanisms 3 are disposed between the support portions 23 of the fixed portion 8 of the carrier 1 and the support portions 24 of the arms 28 extending from the fixed portion 8 inwardly of the vehicle, the entire pin slide mechanisms 3 are located inside of the vehicle with respect to the center C (FIG. 1) of the disc rotor D. As a result, the gravity center G (FIG. 2) of the caliper including the electrically-driven device 7 which is offset inwardly of the vehicle is included within the operating range of the pin slide mechanisms 3. Consequently, even with the weight unbalance in the caliper, the caliper body 2 is not inclined with respect to the braking faces of the disc rotor D during braking, thereby reducing the drag torque and improving the judder property. The proximal ends of the arms 28 of the carrier 1 are connected in the vicinity of the attachment bosses 8a of the fixed portion 8 of the carrier 1. Therefore, the arms are balanced in weight with respect to the bridge portion 9, extending outwardly of the vehicle while straddling the disc rotor D, and the depending portion 10 so that the inclination of the carrier 1 itself is minimized.

Since the pin/bolts 25 are secured to the support portions 23 near the disc rotor D by threading them from the outside of the vehicle, the pads 11, 12 can easily be changed by removing the pin/bolts 25 from the outside of the vehicle. Further, since the pair of support portions 23, 24 are disposed outside of the bridge portion 9 of the carrier 1 and extend in planes which are parallel to the plane that includes the axis of the disc rotor D and includes the center line of the carrier 1 in the width-wise direction (FIG. 3), when the pin/bolts 25 are assembled, the pin/bolts 25 do not interfere with the bridge portion 9. Thus, it is not required that any grooves be formed in the bridge portion 9 of the carrier 1, or that the cylindrical portions 27 of the caliper body 2 be positioned at more laterally extended positions in order to prevent the interference between the pin/bolts and the bridge portion, thereby avoiding expensiveness and bulkiness.

As best seen in FIG. 5, the motor 4 constituting the electrically-driven device 7 comprises a stator 31 fitted into and secured to the body portion 18 of the caliper body 2, and a hollow rotor (coil) 33 rotatably supported by the body portion 18 via a bearing 32. The rotor 33 is provided at its proximal end with a yoke 34 and a magnet 35 so that the rotor can be rotated in a clockwise or counter-clockwise direction upon energization of the stator 31. In the illustrated embodiment, the stator 31 is urged against and secured to a stepped portion in the body portion 18 by an annular hold-down member 37 secured in the open end of the body portion 18 of the caliper body 2 by bolts 36. The bearing 32 is pinched between the body portion 18 and the pawl portion 19 of the caliper body 2, and the rotor 33 is fixed with respect to the bearing 32 by means of an annular hold-down member 39 secured to a rear surface of a front flange by bolts 38. In this case, after the rotor 33 is assembled to the body portion 18 of the caliper body 2, the stator 31 is inserted into the body portion 18 from the rear side. In this regard, since a predetermined distance L is maintained between the rear end of the rotor 33 including the magnet 35 and the rear end (open end) of the body portion 18 of the caliper body 2, the stator 31 can be inserted by utilizing the inner surface of the body portion 18 in this portion "L" as a guide. Consequently, a problem of the stator 31 striking against the magnet 35 during assembly to damage the magnet 35 is avoided.

The urging member 5 is inserted into the hollow interior of the rotor 33, so that they are interfitted with each other via the motion converting mechanism 6. The motion converting mechanism 6 comprises a so-called ball screw mechanism in which balls are disposed between a groove formed in an inner surface of the rotor 33 and a groove formed in an outer peripheral surface of the urging member 5. Thus, the rotor 33 and the urging member 5 also act as a nut and a threaded shaft constituting the ball screw mechanism, respectively. A circular rotation preventing member 41 is secured to the proximal end of the urging member 5 by bolts 40, and a hydraulic cylinder 42 which will be described later is provided on the open end of the body portion 18 of the caliper body 2. A cylinder body 43 of the hydraulic cylinder 42 is secured to the stator hold-down member 37 by bolts 44. The rotation preventing member 41 is provided at its periphery with one or a plurality of projections 41a protruding radially outwardly, which are fitted into axial grooves 43a formed in an inner surface of the cylinder body 43. That is to say, rotation of the urging member (threaded shaft) 5 is prevented by the engagement between the rotation preventing member 41 and the cylinder body 43. Accordingly, if the rotor (nut) 33 of the motor 4 is rotated in the counter-clockwise direction or the clockwise direction, the motion converting mechanism (ball screw mechanism) 6 is operated to reciprocally shift the urging member 5 within the rotor 33 in a longitudinal direction. As the urging member 5 is advanced, the braking force is generated accordingly.

The rotation of the rotor 33 is monitored by a rotary encoder 45. The rotary encoder 45 comprises a rotating disc 47 (with slits) secured to the front end of the rotor 33 by bolts 46, and a detecting portion 49 secured to the front end of the body portion 18 of the caliper body 2 by bolts 48. A signal from the detecting portion 49 is sent to a control device (not shown) through a wiring 50. On the other hand, the control device is connected to the stator (coil) 31 of the motor 4 via a wiring 51, so that the control device controls an electric power to be supplied to the stator 31 on the basis of a feedback signal from the rotary encoder 45. As a result, the rotational amount (rotation angle) of the rotor 33 (and, therefore, shifting amount of the urging member 5) is adjusted to generate the desired braking force. In this case, since the projections 41a of the rotation preventing member 41 are fitted into the axial grooves 43a of the cylinder body 43 through an adequate length, the shifting movement of the urging member 5 is ensured. After the braking, the rotor 33 is rotated in the reverse direction to return the urging member 5 to the initial position.

The hydraulic cylinder 42 has a piston 52 slidably mounted within the cylinder body 43. A seal member 53 is disposed between the piston 52 and the inner surface of the cylinder body 43 to define a closed oil chamber 54 at the inner bottom of the cylinder body 43. The oil chamber 54 is connected, for example, to a master cylinder through a port 55 formed in the bottom of the cylinder body 43. The hydraulic cylinder 42 serves as a fail-safe device if the motor 4 is damaged. Namely, if the motor 4 is damaged, pressurized oil is supplied from the master cylinder to the oil chamber 54, thereby causing the piston 52 to apply axial pressure to the urging member 5. In this case, since the rotation of the urging member 5 is limited by the rotation preventing member 41, the rotor (nut) 33 of the motor 4 is rotated due to the operation of the motion converting mechanism (ball screw mechanism) 6, thereby advancing the urging member 5 to generate the braking force. Incidentally, in FIG. 4, the reference numeral 56 denotes a bleeder for removing air from the oil chamber 54.

Figure 6:
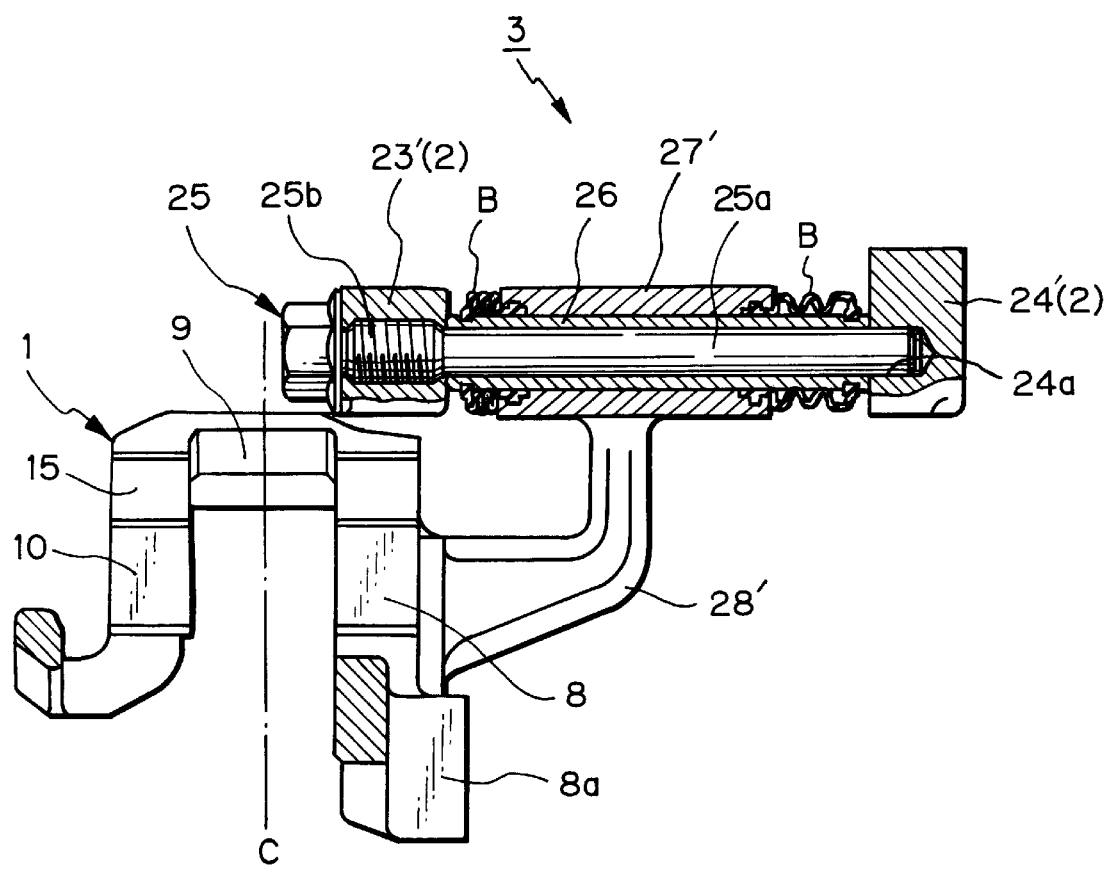
FIG. 6 is a sectional view showing a pin slide mechanism of a disc brake according to a second embodiment of the present invention.
Figure 7:
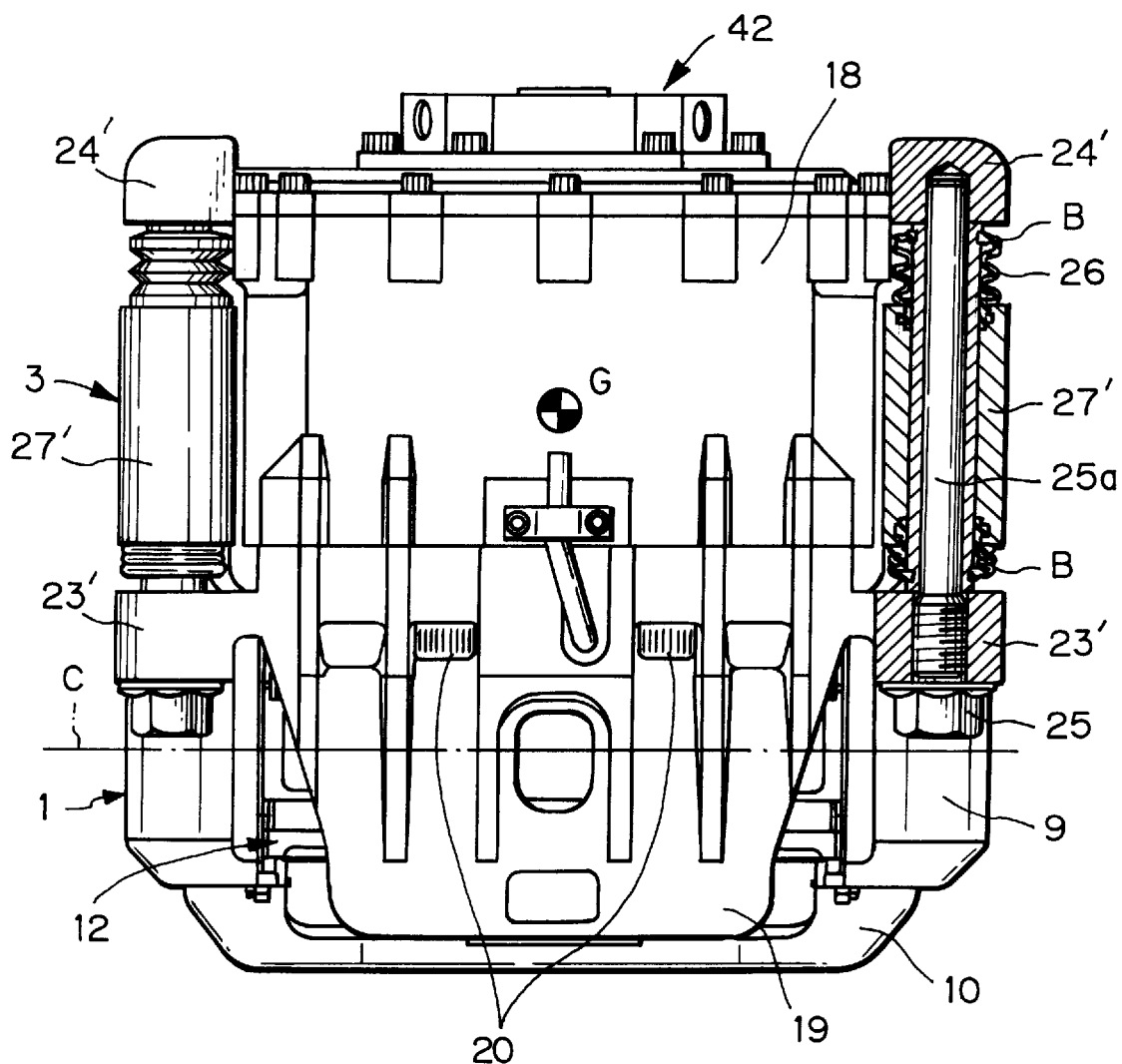
FIG. 7 is a sectional view of a structure of an electrically-driven device constituting the disc brake according to the second embodiment.

FIGS. 6 and 7 show a second embodiment of the present invention. In this second embodiment, as each pin slide mechanism 3, a pair of support portions 23', 24' for supporting both ends of the pin/bolt 25 are provided on the caliper body 2, and a cylindrical portion 27' slidably fitted on the pin portion 25a of the pin slide mechanism 3 via the sleeve 26 is supported by an arm 28' extending from the carrier 1 inwardly of the vehicle. Also in the second embodiment, the caliper in which the electrically-driven device 7 is contained in the caliper body 2 is supported by the carrier 1 in a saddle-mounted fashion. Therefore, the second embodiment brings about the same advantages as those of the first embodiment In FIGS. 6 and 7, the same elements as those in FIG. 1 are designated by the same reference numerals.

As mentioned above, according to the disc brake of the present invention, the pin slide mechanisms for causing the carrier to support the caliper body for floating movement are of saddle-mounted type, and at least the sliding portions of the pin slide mechanisms are disposed inwardly of the vehicle with respect to the disc rotor. Therefore, even if great weight unbalance occurs in the caliper, the supporting of the caliper is stabilized, thereby preventing deterioration of the braking ability, occurrence of great vibration, and deterioration of assembling ability and improving the endurance and reliability. The present invention is particularly applicable to an electrically-driven disc brake in which the gravity center of the caliper body is significantly offset toward the interior of the vehicle.

Further, when the pin slide mechanisms are disposed outwardly of the bridge portion of the carrier in planes parallel to the plane including the axis of the disc rotor and including the center line of the carrier in the width-wise direction, it is not either required that any grooves or recesses be formed in the bridge portion of the carrier, or that the cylindrical portions of the caliper body be positioned at more laterally extended positions in order to prevent the interference between the pin/bolts and the bridge portion, thereby avoiding expensiveness and bulkiness.

What is claimed is:

1. A disc brake comprising:
   a pair of brake pads to be arranged on opposite sides of a disc rotor, said pair of pads comprising an inner side pad and an outer side pad;
   a carrier including a bridge portion for straddling an outer periphery of the disc rotor, said carrier supporting said pair of brake pads so as to allow said pair of brake pads to be shifted in an axial direction of the disc rotor, said carrier to be secured to a non-rotating portion of a vehicle at a location inward of the disc rotor with respect to the vehicle;
   a caliper body including a pawl portion for pushing said outer side pad of said pair of pads and an operation portion having a push mechanism for pushing said inner side pad of said pair of brake pads, said pawl portion to be disposed at a location outward of the disc rotor with respect to the vehicle, said operation portion to be disposed at a location inward of the disc rotor with respect to the vehicle, said pawl portion being connected to said operation portion so as to straddle the outer periphery of the disc rotor; and
   a pin slide mechanism connecting said caliper body to said carrier so as to allow said caliper body to be shifted in an axial direction of the disc rotor with respect to said carrier, said pin slide mechanism including a cylindrical portion, a pin, and a pair of support portions, said pair of support portions being provided on one of said carrier and said caliper body and being spaced apart in an axial direction of the disc rotor, each end of said pin being supported by one of said pair of support portions, said cylindrical portion being provided on the other of said carrier and said caliper body so as to slidably receive said pin such that said pin is accessible from a location outward of the disc rotor with respect to the vehicle for withdrawal and insertion of said pin, wherein a sliding range of said cylindrical portion on said pin is located inward of the disc rotor with respect to the vehicle.

2. The disc brake of claim 1, wherein said pin slide mechanism is disposed at a location outward of said bridge portion of said carrier with respect to the vehicle, and said pin slide mechanism is parallel to a plane including an axis of said disc rotor and a width-wise center line of said carrier.

3. The disc brake of claim 2, wherein said push mechanism comprises an electrically-driven device including a motor, an urging member capable of being shifted in the axial direction of the disc rotor, and a motion converting mechanism for converting rotation of said motor into a straight movement of said urging member.

4. The disc brake of claim 1, wherein said push mechanism comprises an electrically-driven device including a motor, an urging member capable of being shifted in the axial direction of the disc rotor, and a motion converting mechanism for converting rotation of said motor into a straight movement of said urging member.

5. The disc brake of claim 1, wherein said caliper has a center of gravity located within the sliding range of said cylindrical portion regardless of the axial shift of said caliper body.

* * * * *